United States Patent Office 2,700,672
Patented Jan. 25, 1955

2,700,672

METHOD FOR THE PREPARATION OR REMOVAL OF TRYPTOPHANE AND OTHER SUBSTANCES FROM THEIR SOLUTIONS

Daniel Luzon Morris, Seattle, Wash., assignor to Food, Chemical and Research Laboratories, Inc., Seattle, Wash., a corporation of Washington No Drawing. Application April 24, 1950,
Serial No. 157,842

9 Claims. (Cl. 260—319)

This invention relates to the separation of amino acids and other substances from one another, and particularly to the separation of tryptophane from various impurities.

Tryptophane is one of a number of essential amino acids which must be present in the diet of an animal for its continued health. Animals appear to be unable to synthesize these amino acids from other substances which may be present in their diet.

Proteins, which consist partially or entirely of amino acids in combination, usually contain all the essential amino acids in greater or lesser proportion. In the case of some proteins the amount of one or more of these essential amino acids may be so low that the protein cannot be used as the sole source of such amino acids in the diet. Thus, the proteins of the cereal grains are low in lysine and methionine. Similarly, gelatin contains almost no tryptophane.

When proteins of good quality are used for food, there is usually no lack of the essential amino acids. In certain cases, however, an individual may be unable to eat or unable to utilize the foods effectively. This may be the case, for example, with a hospital patient who is unable to take any food by mouth, or with a person whose ability to digest proteins is impaired. In such cases, it is sometimes the practice to administer, either by mouth or by parenteral injection, a mixture of amino acids containing adequate amounts of the essential amino acids.

Such amino acid mixtures can be obtained in various ways, but one way is to subject a whole protein to a digestive process. This digestion may be brought about by acids, alkalies, enzymes, etc. If acids are used, it is often found that the tryptophane of the protein is destroyed during the digestion. If this is the case, the tryptophane must be replaced to assure the nutritional adequacy of the product. For this reason, among others, methods for the production of tryptophane itself are of importance.

At present, tryptophane is prepared in two general ways, namely, (a) synthesis, and (b) isolation from a protein which has been hydrolyzed in such a way as to avoid the destruction of the tryptophane. There are numerous methods under each of these groups. Among those in group (b) may be mentioned the method, devised by Hopkins and Cole in 1901, which consists of hydrolyzing the protein by the prolonged action of a pancreatic enzyme, and then precipitating the tryptophane as its mercury salt. Among more recent methods may be mentioned those which rely on the sorption of tryptophane, along with the other aromatic amino acids, on activated carbon, followed by elution with specific solvents, such as hot aqueous alcohol, or phenol and acetic acid, or cold ammoniacal alcohol. The tryptophane can then be separated from the other amino acids by further treatment. And, finally, there are methods which rely on the retention of polyamino acids, sometimes including tryptophane, on a cation-exchange resin within a rather definitely limited range of pH.

The present invention is concerned with ion-exchange methods and an object thereof is the provision of such a method which results in higher yields and greater purity than heretofore possible.

Another object of the invention is the provision of a method for obtaining tryptophane from a solution containing it by adjusting the solution to a strongly alkaline pH, contacting it with an anion-exchange resin that has previously been treated with a solution of a base, then washing the resin with a solution of a base and finally stripping the tryptophane from the anion-exchanger with an acidic solution.

A further object of the invention is the provision of a method for obtaining tryptophane from a solution containing it by adjusting the solution to a strongly acidic pH, contacting it with a cation-exchange resin that has been previously treated with a solution of an acid, then washing this resin with a solution of an acid and finally stripping the tryptophane from the cation-exchanger with a basic solution.

I have found that in acidic solutions tryptophane is very unstable in the presence of aldehydes. Most of the cation-exchange resins which can be used contain some reactive aldehyde groups, even in the polymerized state of the resin, which are in whole or in part responsible for the destruction of tryptophane placed in contact therewith through the medium of an acid solution. Accordingly, a still further object of this invention is the provision of a method which eliminates or greatly reduces the destruction of tryptophane under such circumstances.

In general, the invention comprises preparing a solution containing tryptophane and making it strongly alkaline by the addition of a suitable basic agent, such as sodium hydroxide, potassium hydroxide, ammonium hydroxide, etc. or a mixture of two or more thereof. The pH of the solution should preferably be in excess of 10. The term "basic" is used herein in its normal meaning in reference to compounds which yield an excess of hydroxyl ions in aqueous solution. The strongly alkaline tryptophane solution is then placed in contact with an anion-exchange resin which has been previously treated with a strong alkali, such as sodium, potassium, ammonium hydroxide or other suitable alkali. Preferred anion-exchange resins for this purpose are Amberlite IRA-400 (a strongly basic anion-exchanger, manufactured by Rohm & Haas, Philadelphia, Pa., and deriving its activity from certain quaternary amine types) and Dowex 1 (a quaternary amine form of styrene divinyl benzene copolymers), but other resins may also be used, particularly those of the quaternary amine type, such as Duolite A-40 and Ionac A-293. These have the effect of removing all or a substantial quantity of the tryptophane from the solution. The anion-exchange resin with the tryptophane thereon is then treated with an alkali solution such as sodium, potassium or ammonium hydroxide. This has the effect of removing impurities without removing substantial amounts of the tryptophane. After this alkali treatment the resin may be washed with water to remove excess alkali and then washed with an acidic solution, that is, one containing an excess of hydrogen ions, to remove or strip the tryptophane from the resin. The acidic solution should preferably have a pH below 5. Hot aqueous acetic acid is a particularly effective solution for this purpose.

Instead of an anion-exchanger, a cation-exchanger may be used in which case the initial tryptophane solution is made strongly acidic (below about pH 3) and the cation-exchange resin prepared by treating it with a strong acid solution of, say, hydrochloric, sulfuric, acetic or other suitable acids. The term "acid" is used herein in its normal meaning in reference to compounds which yield an excess of hydrogen ions in aqueous solution. The solution for treating the cation-exchange resin with the tryptophane thereon for the removal of impurities should also be correspondingly acidic and the final stripping solution should be alkaline, preferably in excess of about pH 9.

Suitable cation-exchange resins are Amberlite IR-100H (a purified form of Amberlite IR-100) Amberlite IR-100 (a phenolic formaldehyde sulfonic acid resin described in U. S. Patents Nos. 2,386,926 and 2,480,654) and Dowex 50 (a sulfonated styrene divinyl type resin), but many others may be used, such as ZeoKarb (a form of sulfonated coal), Duolite C-3 (a phenolic type exchanger), Permutit Q and Duolite Chempro C-20 (styrene type exchangers).

A modification of the cation-exchange procedure comprises pretreating the cation-exchange resin with hydrocyanic acid to counteract the destructive effect of the resin on tryptophane in the presence of acids. By the use of such a pretreatment the efficiency of the process is greatly increased.

It will be apparent to those skilled in the art that this manner of using ion-exchange resins is opposed to that generally used. In previous cases the resins are found to be effective in a range which varies from a weakly acidic to a weakly alkaline solution. Also, when a resin is used in connection with an acidic solution, a basic resin, i. e., an anion-exchanger, is used; whereas when an alkaline solution is being handled, an acidic resin, i. e., a cation-exchanger, is used. In the range very close to neutrality, either or both can sometimes be used. But in the present invention, a basic resin is used with an alkaline solution, or an acidic resin with an acidic solution. These are conditions under which it would be predicted, by those familiar with the art, that the resins would be entirely ineffective; that, in fact, far from removing anything from solution (except hydrogen or hydroxyl ions) the resins themselves would be freed of any materials present on them.

The source of tryptophane for use in the present invention may be any mixture of amino acids, however prepared. This may be obtained by the hydrolysis of a protein under conditions which minimize the destruction of tryptophane, such as hydrolysis with enzymes or alkali, or by acids under the conditions described in U. S. Patent No. 2,470,955. The source may also be a mixture of materials commonly encountered in an organic synthesis, in which the principal product may be tryptophane, but other by-products are also present. The source need not be a material which is in itself fit for food. Thus, tryptophane can be isolated readily from an alkaline digest of fish viscera, such as is sometimes used for the preparation of therapeutic oils.

While the invention herein described is of particular value at the present time for the preparation of tryptophane, due to the high cost of this amino acid, it is not limited to this amino acid. Actually, the invention is applicable to other substances and kinds of substances. For example, if a mixture of amino acids is made alkaline and placed in contact with an anion-exchanger, such as Amberlite IRA-400, and the resin is subsequently washed with alkali and water as described above, and finally treated with an acidic solution, the final solution will be found to contain, along with tryptophane, other amino acids. Accordingly, if desired, these other amino acids might be recovered from the mixture.

Similarly, other materials, of greater or less value, may be recovered, or removed, from their solutions, as will be shown hereinafter.

Although in the case of tryptophane, it is desired to recover it from its solution, occasions may arise when, for one reason or another (such as considerations of toxicity) it is desirable not to recover, but to remove a particular substance from its solution. It is to be understood that the scope of the present invention is broad enough to embrace such removal.

Amberlite IRA-400 is a preferred anion-exchange resin for use in this invention and is used in the form of the free base, in contact with a basic solution of the tryptophane. Amberlite IR-100H is preferred as a cation-exchange resin although it is less strongly active. It is used as the free acid, in contact with an acidic solution of tryptophane.

Certain resins, in removing tryptophane from its solution, combine with it so strongly that the combination cannot be broken by the relatively mild conditions described above, that is, by merely reversing the acid-base state of the surrounding liquid. In such cases, it is sometimes possible, once the resin has taken up the tryptophane, to remove the latter by more vigorous treatment, such as boiling the resin with a dilute aqueous solution of alcohol. In such a case, while the resin may be less valuable for the preparative aspects of the invention, it may be more valuable for the removal aspects.

The following examples illustrate the invention and the manner in which it may be practiced but they are not to be considered as limiting the scope of the invention in any way:

Example 1

Two hundred grams of soy bean meal is heated for two days at 100° C. with one liter of a 20% solution of sodium hydroxide. The solution is diluted with one volume of water, filtered, and the clear filtrate passed through a column, 20 by 200 mm., of Amberlite IRA-400, which has previously been treated with 1 liter of 4% sodium hydroxide solution. The effluent from the column is found to be free of tryptophane. The column is washed with 500 ml. of 8% sodium hydroxide solution, and then with 1 liter or more of water. It is then leached out with a 6% solution of acetic acid. The solution so obtained is evaporated to small volume, under reduced pressure, whereupon prismatic crystals of tryptophane form spontaneously in the solution. These may be filtered off and washed. They may then be purified by recrystallization from dilute alcohol, acetic acid, etc. The purity of the product after one such recrystallization may exceed 90%.

Example 2

A sample of casein is hydrolyzed by treatment, in a solution containing sodium carbonate and sodium fluoride, with pancreatin, a concentrated pancreatic enzyme, and toluene as a preservative. This hydrolytic process is well known. At the end of more than a week, during which time more pancreatin may be added, 4% of sodium hydroxide is added to the solution, it is filtered, and further treated as described in Example 1.

Example 3

Either casein or soy bean meal is mixed with the cecal portion of fish viscera, which is rich in proteolytic enzymes, together with sodium carbonate. After the mixture has been allowed to incubate, in the presence of toluene as an antiseptic, for a period of several days, at a temperature of about 40° C., it is made alkaline with sodium hydroxide and treated as in Example 1.

Example 4

A solution of casein hydrolysate, prepared as in Example 2, is acidified by the addition of about ¹⁄₁₂ its volume of concentrated hydrochloric acid. This solution is then passed slowly through a column of the cation-exchanger Amberlite IR-100H, which has previously been treated with 3% hydrochloric acid. The concentration of tryptophane in the effluent from this column is found to be much lower than that in the influent. The column is washed with 3% hydrochloric acid, and then water, after which it is leached out with a 3% solution of ammonium hydroxide. The ammoniacal solution so obtained is found to be rich in tryptophane.

Example 5

A solution containing 3% hydrochloric acid and 0.1% tryptophane is passed through a column of the cation-exchange resin, Dowex 50, which has been previously treated with 3% hydrochloric acid. The effluent from this column is found to be free of tryptophane. The column is now washed successively with 3% hydrochloric acid, water, 4% sodium hydroxide, and finally water. The resin is now removed from the column and heated to 80° C. with an alcohol-water mixture containing about 65% alcohol. The alcoholic solution is found to contain tryptophane.

I claim:

1. The method of extracting tryptophane from a solution containing tryptophane and other amino acids, said method comprising adjusting the pH of the solution to above 10 and placing it in contact with a strongly basic anion exchange resin, said resin having previously been treated with a solution containing an excess of hydroxyl ions, whereby tryptophane in the solution is adsorbed by the resin to the exclusion of substantially all other amino acids in the solution, then eluting the tryptophane from the resin, and then effecting crystallization of the tryptophane from the resulting eluate.

2. The method of extracting tryptophane from a solution containing tryptophane and other amino acids, said method comprising adjusting the pH of the solution to above 10 and placing it in contact with a strongly basic anion exchange resin, said resin having previously been treated with a solution containing an excess of hydroxyl ions, whereby tryptophane in the solution is substantially selectively adsorbed by the resin, then washing the resin with another solution containing an excess of hydroxyl ions to remove impurities from the resin and leave the tryptophane adsorbed on the resin to the exclusion of substantially all other amino acids in the solution, then eluting the tryptophane from the resin, and then effecting crystallization of the tryptophane from the resulting eluate.

3. The method as defined by claim 1 in which the resin is of the quaternary amine type.

4. The method as described by claim 2 in which the resin is washed with water immediately prior to elution of the tryptohane to remove excess alkali.

5. The method as defined by claim 1 in which the tryptophane is eluted from the resin with a solution containing an excess of hydrogen ions.

6. The method as defined by claim 1 in which the tryptophane is eluted from the resin with a hot aqueous alcohol solution.

7. The method of extracting tryptophane from a solution containing tryptophane and other amino acids, said method comprising adjusting the pH of the solution to above 10 and placing it in contact with a strongly basic anion exchange resin, said resin having been previously treated with a solution containing an excess of hydroxyl ions, whereby tryptophane in the solution is adsorbed by the resin to the exclusion of substantially all other amino acids in the solution, then washing the resin with another solution containing and excess of hydroxyl ions to remove impurities, then washing the resin with water to remove excess alkali, eluting the tryptophane from the resin with a solution having a pH below about 5, and then effecting crystallization of the tryptophane from the eluate.

8. The method of selectively extracting tryptophane from a solution containing tryptophane and other amino acids, said method comprising adjusting the pH of the solution to above 10, treating a strongly basic anion exchange resin with a different solution having an excess of hydroxyl ions, placing the said amino acid solution in contact with the treated resin, whereby tryptophane in the solution is adsorbed by the resin to the exclusion of substantially all other amino acids in the solution, then washing the resin with another solution containing an excess of hydroxyl ions to remove impurities from the resin, then eluting the tryptophane from the resin, and then effecting crystallization of the tryptophane from the eluate.

9. The method as defined by claim 8 in which the resin is of the quaternary amine type.

References Cited in the file of this patent

UNITED STATES PATENTS

| | | |
|---|---|---|
| 2,416,956 | Sahyun | Mar. 4, 1947 |
| 2,480,654 | Howe | Aug. 30, 1949 |

OTHER REFERENCES

Chem. Abst., vol. 38, p. 4631 citing Turba, Naturwissenschaften, 31, pp. 508–10 (1943).

Winters et al., Industrial and Engineering Chemistry, vol. 41, pp. 460–463 (March 1949).